United States Patent

Gimmler et al.

Patent Number: 5,546,793
Date of Patent: Aug. 20, 1996

[54] PROCESS FOR DETERMINING GAS-FORCE TRANSMITTED TORQUE TO AN INTERNAL-COMBUSTION ENGINE CRANKSHAFT

[75] Inventors: Helmut Gimmler, Schwaikheim; Ulrich Nester, Neuhausen; Gerhard Kurz, Wendlingen; Werner Huhn, Weinstadt, all of Germany

[73] Assignee: Mercedes-Benz AG, Germany

[21] Appl. No.: 400,107

[22] Filed: Mar. 6, 1995

[30] Foreign Application Priority Data

Mar. 4, 1994 [DE] Germany .................. 44 07 167.1

[51] Int. Cl.$^6$ ................................ G01M 15/00
[52] U.S. Cl. ........................ 73/116; 364/431.07
[58] Field of Search .................. 73/116, 117.3; 364/431.03, 431.07

[56] References Cited

U.S. PATENT DOCUMENTS

| | | | |
|---|---|---|---|
| 4,301,678 | 11/1981 | Full et al. | |
| 4,843,553 | 6/1989 | Ohata | 364/426.04 |
| 4,843,870 | 7/1989 | Citron et al. | 73/116 |
| 5,222,394 | 6/1993 | Imai | 73/117.3 |
| 5,359,519 | 10/1994 | Jehanno | 73/115 |

FOREIGN PATENT DOCUMENTS

| | | |
|---|---|---|
| 0280948A1 | 9/1988 | European Pat. Off. . |
| 0434665A1 | 6/1991 | European Pat. Off. . |
| 0437057A1 | 7/1991 | European Pat. Off. . |
| 0532419A1 | 3/1993 | European Pat. Off. . |
| PCT/US89/05392 | 4/1989 | WIPO . |

OTHER PUBLICATIONS

Engine Fault Analysis: Part II – Parameter Estimation Approach, A. Soqd et al., IEEE Transaction on Industrial Electronics IE–32 (Nov. 1985), No. 4 pp. 301–307.

*Primary Examiner*—Richard Chilcot
*Assistant Examiner*—Eric S. McCall
*Attorney, Agent, or Firm*—Evenson, McKeown, Edwards & Lenahan, P.L.L.C.

[57] ABSTRACT

A process determines the torque transmitted by the gas forces to the crankshaft of an internal-combustion engine. The rotational speed data which is detected by determining the angular speed of a component fixedly connected with the crankshaft is analyzed, and the rotating moment is computed from the angular speed correlated with the rotational speed by way of the moment of inertia of the engine. In addition to the rotational moment of the engine, the torques of the oscillating masses, the torsional moments of the crankshaft and the static torques resulting from all slowly variable friction moments, effective moments and load moments are determined. From a balance of these individual torques, the torque resulting form the gas forces is determined. Subsequently, the work delivered by the individual cylinders per working cycle is determined from this torque. The thus determined operating parameters is used for the engine control and/or for the on-board diagnosis.

11 Claims, 1 Drawing Sheet

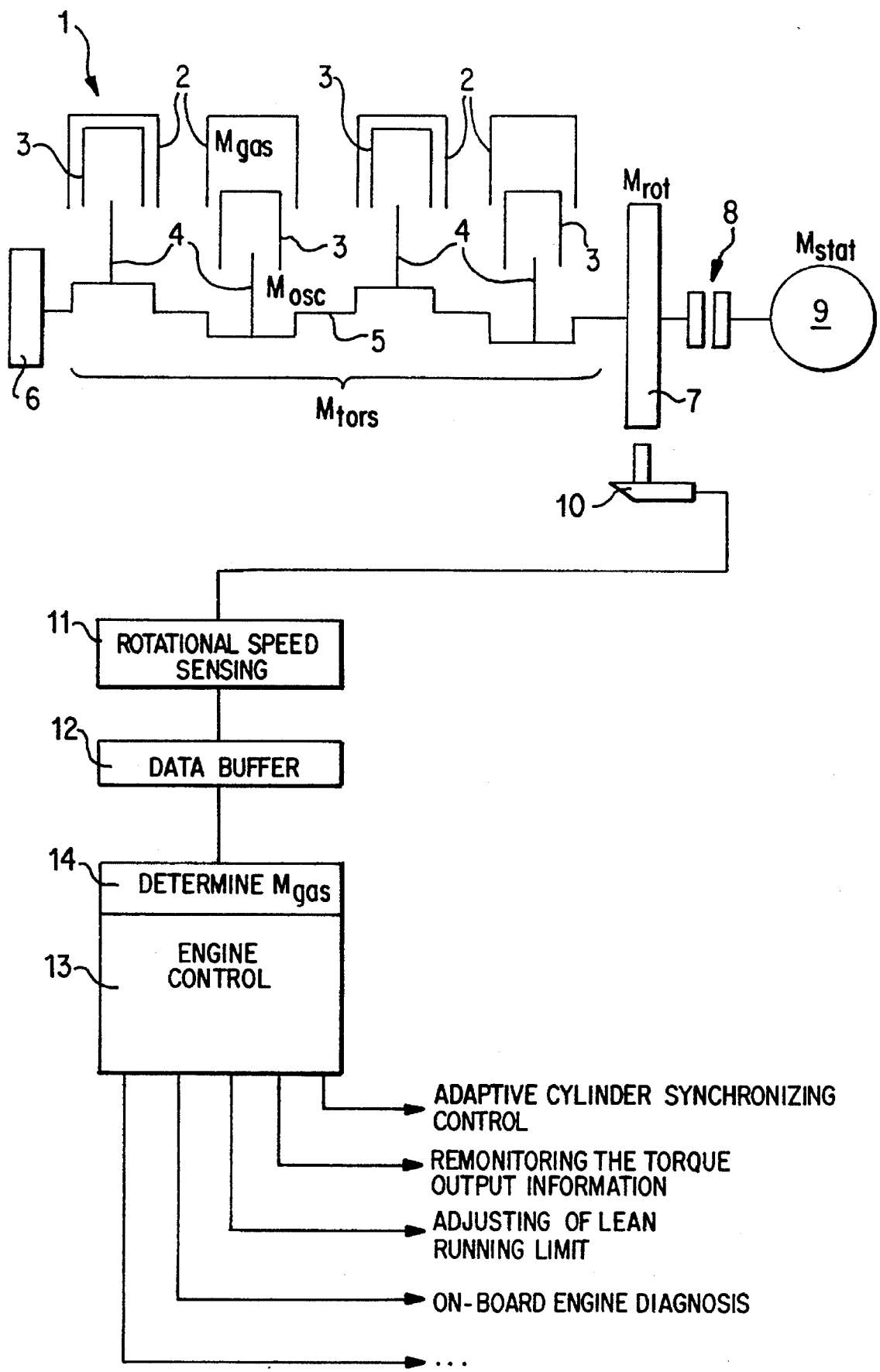

PROCESS FOR DETERMINING GAS-FORCE TRANSMITTED TORQUE TO AN INTERNAL-COMBUSTION ENGINE CRANKSHAFT

BACKGROUND AND SUMMARY OF THE INVENTION

The present invention relates to a process for determining the torque transmitted by gas forces to the crankshaft of an internal-combustion engine by analyzing the rotational speed data, and, more particularly, to a process which detects the rotational speed data by determining rotating speed of a component fixedly connected with an engine crankshaft, the rotating moment being computed by the inertia moment of the engine from the angular speed correlated with the rotational speed.

DE-OS 40 40 648 describes a process for a non-test-bench determination of characteristic technical values of internal-combustion engines and their individual cylinders. The rotational speed, the rotational moment, the work and the power of the internal-combustion engine or of individual cylinders of the internal-combustion engine, are determined by detecting the rotating movement of the crankshaft. A disadvantage of this process is that the torques which result from the acceleration of the pistons and oscillating mass components of the connecting rods and from the crankshaft torsion are not taken into account.

The use of electronic engine controls for diesel and Otto engines is becoming increasingly important. Unfortunately, the resulting advantages with respect to consumption and exhaust gas have been counteracted by unsolved problems in the precise quantitative proportioning because of high component tolerances and aging-related drifts. Intensive efforts to maintain increasingly smaller tolerances and to improve long-term stability of magnetic valves and other components relevant to the quantitative proportioning can be reduced almost to zero by the use of an engine regulating system. So far, however, no low-cost process which can be used in series production has been available for recognizing such tolerance-caused cylinder-specific output differences.

It is an object of the present invention to provide a process by way of which the torque, which is transmitted from the pistons by the connecting rods to the crankshaft and which results from the gas pressures in the cylinders, can be determined from the rotational speed signal.

This object has been achieved in accordance with the present invention by a process which uses an engine model to compute torque of oscillating masses, moments from the crankshaft torsion and static torque composed of all slowly variable friction moments, effective moments and load moments, determines torque from these torques and moments, resulting from gas pressures in engine cylinders, and supplies the resulting torque to a control system and/or a diagnostic system for the engine.

By taking into account the torques of the oscillating masses, the torsional moments of the crankshaft and the static torques, the torque which is transmitted from the pistons by the connecting rod to the crankshaft and which results from the gas pressures in the cylinders is determinable. From this quantity, the work which is carried out by the individual cylinders per working cycle or other operating parameters correlated with this torque can then be determined and supplied to the engine control or the on-board diagnostic system.

In order to reduce the computing power requirements of the analysis unit, the torsional moments occurring in the normal operation are preferably first computed once and then stored in a characteristic diagram. It is further advantageous for the use in engine control to store, the corresponding derived effects of the torsional moments on a control quantity of the engine control, instead of the torsional moments, in a characteristic diagram.

By way of a precise rotational speed measurement and by a detailed engine model, the process according to the present invention now provides a control quantity for the identification of the cylinder-specific output. By way of these quantities derived from the rotational speed, a control device for the compensation of differences caused by manufacturing and aging can be implemented with respect to each cylinder in the entire characteristic engine diagram. As a result, the rotational speed and the quantities derived therefrom, such as the angles of rotation, the angular speed and the angular acceleration, are the only quantities required for computing the work delivered per cylinder and working cycle, or the corresponding control quantity.

BRIEF DESCRIPTION OF THE DRAWING

These and other objects, features and advantages of the present invention will become more readily apparent from the following detailed description thereof when taken in conjunction with the accompanying sole figure which schematically illustrates the basic construction of the process according to the present invention for a four-cylinder internal-combustion engine.

DETAILED DESCRIPTION OF THE DRAWING

An internal-combustion engine which is designated generally by the reference numeral 1, comprises four cylinders 2 in each of which one piston 3 respectively is movably guided. The pistons 3 are each connected by a rod 4 with a crankshaft 5 to which a vibration damper 6 and a starter gear ring comprising a flywheel 7 are fastened. Another incremental wheel may also be provided at the starter gear ring 7. The crankshaft 5 is coupled by a clutch 8 to the drive train which is designated generally by the reference numeral 9.

A sensor 10 senses the rotational speed of the gear wheel 7, and a signal representative of the rotational speed is analyzed in the analysis unit 11. The rotational speed information is then be supplied via a data buffer 12 to the engine control system 13 in which, with the aid of a microprocessor 14 and an engine model, the torques $M_{gas}$ which are caused by the gas forces in the cylinders 2 are determined. In this case, the microprocessor 14 can be integrated into the engine control system 13 or may be constructed as a separate unit. From the engine control system 13, the determined torque $M_{gas}$ or other quantities correlated with the torque $M_{gas}$, such as the engine power P, the work W delivered per working cycle and per cylinder 2 to the crankshaft 5 as well as other control quantities are supplied to the individual control or diagnostic systems. These controls or systems can be an adaptive cylinder synchronizing control, the adjustment of the lead running limit, a control for rendering the torque delivery uniform, on-board engine diagnosis, or other control or regulating systems.

The rotational engine speed, n, is preferably sensed by a conventional sensor 10 on the flywheel side of the internal-combustion engine 1 on the gear wheel 7 comprising in the currently contemplated embodiment preferably 60 teeth. However, the number of teeth of the gear wheel 7 must at least be clearly higher than the number of cylinders 2. In this currently preferred embodiment, an already existing sensor 10 on an incremental wheel may be used or an additional sensor 10 may be installed on the starter gear ring 7. For correcting periodically recurring pitch errors, additional conventional correcting methods are used.

The starting point for determining the torque $M_{gas}$, which results from the gas pressures, in the microprocessor 14 is an engine model which is based on the dynamic balance of moments at the gear wheel 7. Here, the following torques are taken into account which affect the gear wheel 7 directly or indirectly:

(a) the torque $M_{gas}$ which is transmitted from the pistons 3 by way of the connecting rods 4 to the crankshaft 5 and results from the gas pressures in the cylinders 2;

(b) the rotating moment $M_{rot}$ which results from the mass inertia and which constantly counteracts a change of speed;

(c) the oscillating torque $M_{osz}$ which is transmitted by way of the connecting rods 4 and results from the acceleration of the pistons and the oscillating mass components of the connecting rods 4;

(d) the moment $M_{tors}$ from the crankshaft torsion of the internal-combustion engine 1; and (e) the static torque $M_{stat}$ resulting from all slowly variable friction moments, effective moments and load moments.

Since these torques are always balanced, the following applies:

$$M_{gas} + M_{rot} + M_{osz} + M_{tors} + M_{stat} = 0$$

The computation of the rotating moments $M_{rot}$ and of the oscillating torques $M_{osz}$ is based on a rigid model of the power unit 9, in which case a two-point resolution is used with respect to the connecting rods 4. The rotating moment $M_{rot}$ will then be obtained from the rotating mass inertias, J, of the internal-combustion engine 1 by using the angular acceleration $\omega$ in the relationship $$M_{rot} = -J\dot\omega$$

wherein the angular acceleration $\dot\omega$ is derived by a time differentiation of the determined rotational speed n.

The oscillating torques $M_{osz}$ are obtained from the knowledge of the relative piston speed $$\dot\chi = \sin\psi + \lambda\frac{\sin\psi\cos\psi}{\sqrt{1 - \lambda^2\sin^2\psi}}$$

and the relative piston acceleration $$\ddot\chi = \cos\psi + \lambda\frac{\cos^2\psi - \sin^2\psi + \lambda^2\sin^2\psi}{\sqrt{1 - \lambda^2\sin^2\psi^3}}$$

in $$M_{osz} = -m_o r^2 \dot\chi (\dot\chi\dot\omega + \ddot\chi\omega^2)$$

wherein
 $\lambda$=connecting rod ratio
 $\Psi$=crank angle
 $\omega$=angular speed
 $\dot\omega$=angular acceleration
 $m_o$=oscillating masses
 r=crank radius Because the oscillating torques $M_{osz}$ depend on the square of the angular speed $\omega$, it is clear that, as the rotational speed, n, rises, this oscillating torque component will become more important and must therefore not be neglected in the determination of the torque $M_{gas}$.

In addition to the rotating moments and the oscillating torques $M_{rot}$, $M_{osz}$, which are computed on the basis of a rigid crankshaft 5, the torsional moment $M_{tors}$ must be taken into account particularly at higher rotational speeds, n, and in resonance ranges. For this purpose, the crankshaft 5 is considered to be an elastic spring, i.e., a mass system which stores the impressed torques M and supplies these torques again in a time-staggered manner. Here, the excitation of the torsional vibrations always takes place by the impressed gas torques and oscillating mass torques $M_{gas}$, $M_{osz}$.

Several methods exist for computing these torsional moments $M_{tors}$. An iterative method, which extrapolates the torques $M_{gas}$ determined in the preceding step and uses them as a new input quantity, is relatively accurate but computationally intensive. Another method consists of first computing the torsional moments $M_{tors}$ occurring in the normal operation of the internal-combustion engine 1 and storing these moments in a operating-parameter-dependent characteristic diagram. During the operation, these values will then be read out of the characteristic diagram as a function of the momentary operating condition of the internal-combustion engine 1 and be provided for the determination of the torques $M_{gas}$. If the torque $M_{gas}$ to be determined is used for the engine control, it is more advantageous to file, instead of the actual torsional moment $M_{tors}$, the effect derived therefrom on the control quantity of the engine control in a characteristic diagram.

A currently preferred embodiment of a torsional model is now described. For computing the torsional moments $M_{tors}$, a vibrating system is modelled by way of which the torsional moments $M_{tors}$ are computed which occur within the internal-combustion engine. The crankshaft vibrating system is typically divided into: (1) one mass per crank at which the gas torques and oscillating torques (exciter torques) are entered into the vibrating system; (2) one or several masses which describe the crankshaft from the last crank mounted on the output side to the flywheel; and (3) and three to five masses which describe the vibrations of the free crankshaft end, particularly of a torsional vibration damper and of a fan.

Between these individual or point masses, springs (torsional rigidities) and dampers (relative dampings), respectively, are modelled whose values must be identified for the respective used engine type to be as close to reality as possible. Furthermore, it is useful to provide so-called absolute dampings which dampen the entire vibrating movement.

Newton's law of motion for rotating masses is the basis of the above-described torsional vibration replacement system with the damping and excitation. The exciter torque is in equilibrium with the other moments on this mass:

$$E_L = m_L * \ddot\phi_L + a_L * (\dot\phi_L - \xi) + M_{tors_L} - M_{tors_{L-1}}$$

In this case, the actual torsional moments $M_{tors}$ of the adjoining springs and dampers are:

$$M_{tors_L} = C_L * (\phi_L - \phi_{L+1}) + b_L * (\dot\phi_L - \dot\phi_{L+1})$$

$$M_{tors_{L-1}} = C_{L-1} * (\phi_{L-1} - \phi_L) - b_L * (\dot\phi_{L-1} - \dot\phi_L)$$

This results in differential equations of the following form which generally are to be solved numerically:

Mass $m_{L-1}$ $$m_{L-1} * \ddot\phi_{L-1} + a_{L-1} * (\dot\phi_{L-1} - \xi) + b_{L-1} * (\dot\phi_{L-1} - \dot\phi_L) + c_{L-1} * (\phi_{L-1} + \phi_L) = E_{L-1}$$

Mass $m_L$

-continued $$m_L * \phi_L + a_L * (\phi_L - \xi) + b_L * (\phi_L - \phi_{L+1}) +$$
$$c_L * (\phi_L - \phi_{L+1}) + b_{L-1} * (\phi_L - \phi_{L-1}) +$$
$$c_{L-1} * (\phi_L - \phi_{L-1}) = E_L$$

Mass $m_{L+}\ldots$ $$m_{L+}\ldots * \phi_{L+}\ldots + a_{L+}\ldots * (\phi_{L+}\ldots - \xi) +$$
$$b_{L+}\ldots * (\phi_{L+}\ldots - \phi_{L+}\ldots_{-1}) +$$
$$c_{L+}\ldots * (\phi_{L+}\ldots - \phi_{L+}\ldots_{-1}) = E_{L+}\ldots$$

The following quantities were used in this case:
a=absolute damping resistance [Nms]
b=relative damping resistance [Nms]
c=torsional rigidity [Nm/rad]
m=inertia mass [kg**2]
E=exciter torque [Nm]
$M_{tors}$=torsional moment [Nm]
$\phi$=torsional angle [rad]
$\xi$=speed [rad/s] of a non-vibrating but co-rotating point (vibration node)
L=counting index The effect of the torsional vibration on the rotating speed of the mass on which the sensor for measuring the rotational engine speed is mounted is in each case estimated from this model. Thus, the components, which previously were superimposed as a disturbance, can now be eliminated.

For increasing the precision, it is useful to supplement the model by additional vibrating elements (spring, damping, mass) for describing the vibrations in the drive train. Because of the different natural frequencies of the internal-combustion engine and drive train vibrating systems, however, it is generally sufficient, as a rule, to achieve damping of the undesirable influences of the drive train by a suitable high-pass filtering, preferably of the determined gas torque but also of the rotational speed input quantity.

It is necessary to take these internal torsional moments $M_{tors}$ into account mainly with high loads and rotational speeds, particularly in the case of charged diesel truck engines but also in the case of passenger car engines in the higher rotational speed range. If, in these cases, some form of the internal torsional moment $M_{tors}$ is not taken into account in the model, errors during the derivation of control quantities with respect to the individual cylinders from the rotational engine speed will be unavoidable.

The torque $M_{gas}$ determined with the process according to the present invention, or the correspondingly derived work W per working cycle and cylinder, can now be used as an input quantity for various applications in engine control and on-board diagnosis. The work $W_z$ per individual cylinder can now be determined, for example, as a summation torque at 120° crankshaft angle after the top dead center of the respective cylinder z:

$$W_z = \int_{OT_z}^{OT_z + 120°} M_{gas}$$

However, this summation torque $W_z$ also includes the work by the expansion without combustion, but the resulting equal component may be taken into account during the control by an appropriate selection of the control factor. For forming a control quantity, preferably the deviation of the work $W_z$ per individual cylinder from the mean value of all cylinders $$\overline{W} = \frac{1}{4} \sum_{z=1}^{4} W_z$$

is determined. Since the thus obtained control quantity is subjected to stochastic scattering, a formation of the mean value may be carried out over several working cycles.

One example of an application is the rotational-speed-based adjustment of the lean running limit for Otto engines. The lean running limit bounds the operating range for the air fuel ratio, $\lambda$, in which a regular combustion takes place. If the air fuel ratio, $\lambda$, exceeds the lean running limit, misfires must be expected. In this case, the recognition is utilized that so-called cycle fluctuations occur in every operating point of the internal-combustion engine. This means that the determined torques $M_{gas}$ have scattering in the amplitude and the signal shape with the result that also the cylinder-specific work $W_z$ derived from the torque $M_{gas}$ scatters from one working cycle to the next. The amount of scattering, the so-called "spread", is a function of the air fuel ratio, $\lambda$, in the respective cylinder 2. A lean mixture results in extensive scattering; a rich mixture results in low scattering.

Inversely, conclusions can be drawn from a statistical analysis of the spread to the air fuel ratio $\lambda$ per cylinder. Particularly within the range of the lean running limit, the spread depends considerably on a change of the air fuel ratio $\lambda$. This circumstance may be utilized for an adjustment of the lean running limit per individual cylinder. In this case, the air fuel ratio $\lambda$ is adjusted by the determined spread such that a stable combustion is still ensured, but the lean running capacity of the internal-combustion engine 1 is fully utilized. This will result in advantages with respect to the consumption and the exhaust gas emissions.

Another application of the present invention is adaptive cylinder synchronizing control. A determination of the torque $M_{gas}$ from the rotational speed, n, achieves a coordination of the respective cylinder output. For this purpose, for example, an adaptive characteristic field contains the deviations of each cylinder 2 from the mean value $\overline{\omega}$ in each rotational speed and load point and adapts slowly to the aging drift of the internal-combustion engine 1. Since, when the mean is, for example, taken over twenty working cycles, the control quantity also includes all twenty working cycles in a crankshaft-synchronous manner, the control device is preferably also configured in a crankshaft-synchronous manner. In this particular application, the control factor is preferably selected such that by the end of the control cycle, the deviation of the last cycle is completely compensated.

In order to prevent deviations from other characteristic diagram points resulting in changes in the actual characteristic diagram point in the event of fast load changes due to the use of the means, a storage in the characteristic diagram will be permitted only if, during the entire time duration required for taking the mean of the control quantity, the actual characteristic field point has not been deviated from or left. In order to prevent that the other cylinders are supplied with fuel to beyond the smoke limit when one cylinder fails, the adjustment may be limited to a maximal value, for example, 25%.

With the adaptive control of the present invention, enormous savings are possible in manufacturing and maintenance of internal-combustion engine because tolerances caused by manufacturing or wear are compensated automatically. Furthermore, as a result, a better utilization of the engine power and a reduction of the exhaust gas values are permitted.

As another application of the present invention, a uniform torque output of the internal-combustion engine 1 is achievable with respect to comfort aspects. Because of the torsional influences on the crankshaft 5, that torque output is not necessarily the same as a cylinder coordination. Finally, the determined torque $M_{gas}$ may also be used for the on-board diagnosis of combustion and compression, as well as for recognizing component failure which is indicated by a specific change of the combustion quality.

The process according to the present invention is not limited to the above-described four-cylinder internal-combustion engines 1 or to the above-described specific applications. The present invention can naturally also be applied to other internal-combustion engines and also to other engine control components.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. Process for determining operating parameters of an internal-combustion engine, comprising the steps of analyzing a rotational speed data which is detected by determining rotational speed of a component fixedly connected with an engine crankshaft, a rotating moment being computed by an inertia moment of the engine from angular speed correlated with the rotational speed, using an engine model to compute torque of oscillating masses, moment of crankshaft torsion and static torque composed of slowly variable friction moments, effective moments and load moments, determining torque on a cylinder-individual basis from the torques and moments, resulting from gas pressures in engine cylinders, and supplying the resulting torque to at least one of a control system and/or a diagnostic system.

2. The process according to claim 1, wherein work delivered by individual engine cylinders per working cycle is determined from the resulting torque.

3. The process according to claim 1, wherein moments of the rotating and of the oscillating masses are computed on the basis of a rigid model of a power unit according to the formulas $$M_{rot} = -J\dot{\omega}$$

and $$M_{osz} = -m_o r^2 \dot{x}(+e, dot\ x\omega + ee + \ddot{x}\omega^2)$$

wherein

J=rotating mass inertia of the internal-combustion engine
$\omega$=angular speed
$\dot{\omega}$=angular acceleration
$m_0$=oscillating masses
r=crank radius $$\dot{\chi} = \sin\psi + \lambda \frac{\sin\psi\cos\psi}{\sqrt{1 - \lambda^2\sin^2\psi}} \quad \text{relative piston speed}$$

$\lambda$=connecting rod ratio
$\Psi$=crank angle, and $$\ddot{\chi} = \cos\psi + \lambda \frac{\cos^2\psi - \sin = \psi + \lambda^2\sin^4\psi}{\sqrt{1 - \lambda = \sin^2\psi^3}} \quad \text{relative piston acceleration}$$

4. The process according to claim 1, wherein the moment of the crankshaft torsion is filed in an operating-parameter-dependent characteristic diagram.

5. The processing according to claim 1, wherein the determined torque is used for the on-board engine diagnosis.

6. The process according to claim 1, wherein the determined torque is used for engine control.

7. The process according to claim 6, wherein the effect of the moment of the crankshaft torsion on control quantities of an engine control unit is filed in an operating-parameter-dependent characteristic diagram.

8. The process according to claim 6, wherein the determined torque is used for adaptive cylinder synchronizing control.

9. The process according to claim 6, wherein the determined torque are used for rendering torque output uniform.

10. The process according to claim 6, wherein determined torque is used for a lean running limit adjustment.

11. The process according to claim 10, wherein, for individual cylinders, scattering of the determined torque is detected with respect to at least one of shape and amplitude for several successive working cycles, and air - fuel ratio of the engine is adjusted by determined spreads to produce desired values per individual cylinder.

* * * * *